United States Patent Office 2,929,160
Patented Mar. 22, 1960

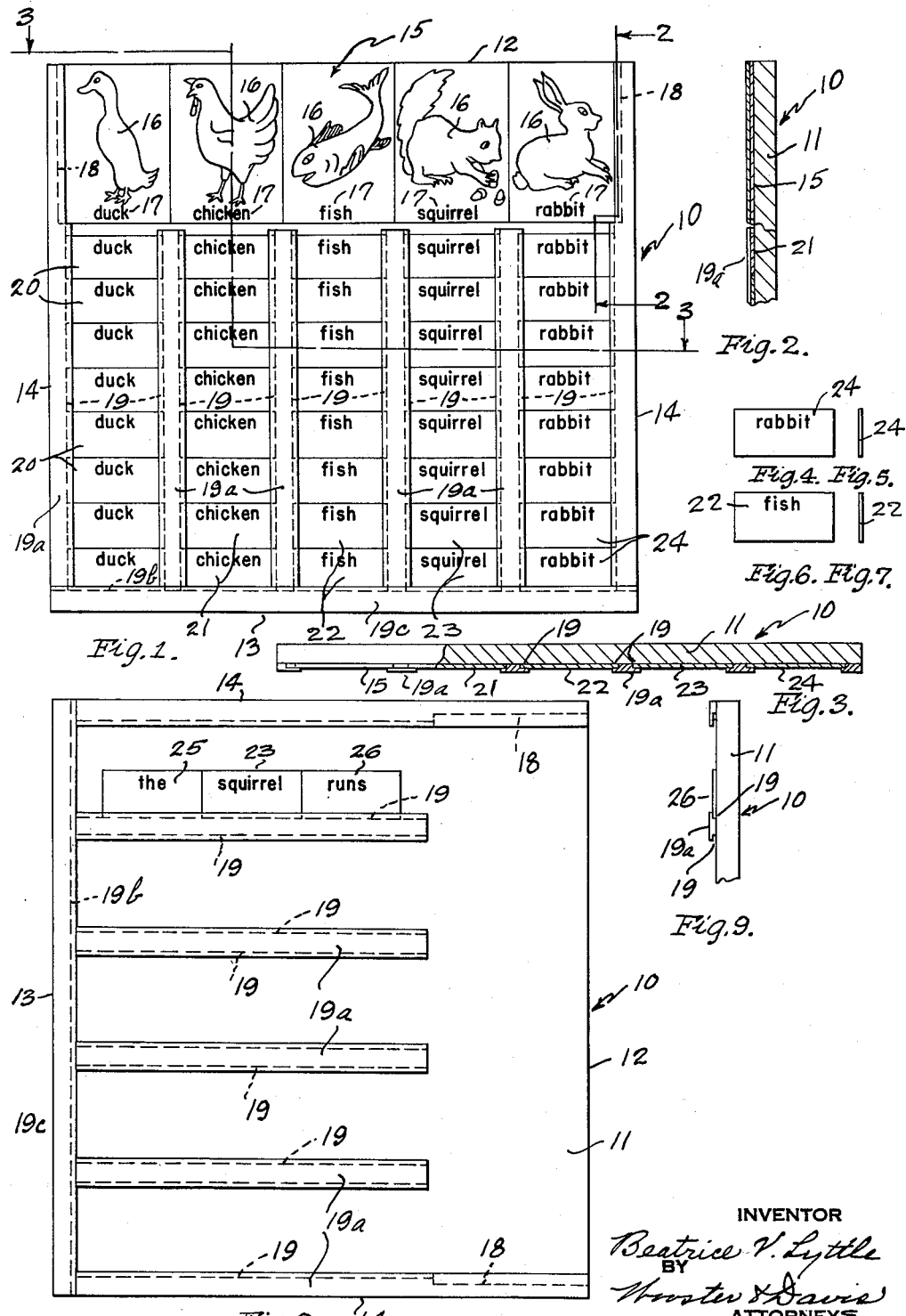

2,929,160

WORD DRILL BOARD

Beatrice V. Lyttle, Middlebury, Conn.

Application October 6, 1958, Serial No. 765,597

4 Claims. (Cl. 35—73)

This invention relates to a word drill board, and has for an object to provide a device of this character which is adapted to be used by a small child to help him to coordinate and learn different words, and may be employed by a teacher in school or by parents of the child.

Another object is to provide a device which provides greater opportunities for word comparison, offered in a new manner for a quicker and more successful way of teaching word perception.

Still another object is to provide a device which has for the child the challenge of a game, the feel of a puzzle, and offers great satisfaction for completion, and when employed as a game will challenge children and stimulate them to put forth an effort they would not use for ordinary word drill and one to which they would give more voluntary attention than they would give to the methods now commonly used.

A still further object is to provide a device in which other vocabulary words may be built around the object words by having them form sentences, with the use of two or three extra words used with and after the basic words have been learned.

With the foregoing and other objects in view I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a front view of the board showing it completed in using the pictures of different named objects and of cards to be associated therewith;

Fig. 2 is a partial vertical section substantially on line 2—2 of Fig. 1;

Fig. 3 is a partial vertical view and partial longitudinal section taken substantially on line 3—3 of Fig. 1;

Fig. 4 is a front view of one of the cards;

Fig. 5 is an end view thereof;

Fig. 6 is a front view of another card;

Fig. 7 is an end view thereof;

Fig. 8 is a front view of the board turned to a position substantially at right angles to Fig. 1 to illustrate another use of the board, and Fig. 9 is an edge view of the upper portion thereof, looking from the right of Fig. 8.

This device comprises a board 10 of any suitable material including a backing or body 11 on the front surface or side of which is mounted means for removably holding various other elements of the device. Although the board is normally used in the horizontal position, it will be considered as comprising a top edge 12, a bottom edge 13 and upright lateral side or end edges 14 for more easy identification. Mounted on the front of this board adjacent the top edge thereof is means for removably holding an elongated strip 15 of material on which may be printed or otherwise provided and arranged side by side pictures of a series of different objects 16, the objects shown being a number of different animals, but could, of course, be other objects if desired. The strip 15 on which the pictures are printed or otherwise provided may be a strip of stiff paper or light cardboard or similar material, and associated with each picture and preferably printed directly under it is the corresponding name, as indicated at 17. Various means may be provided for mounting this strip at the top of the board, but a simple and effective means is that shown, comprising a pair of inwardly facing upright guide channels 18 adjacent the opposite end or upright side edges 14 of the board, and open at the top edge of the board for easy insertion and removal of the strip 15.

Also mounted on the front face of the board and below the strip 15 when the strip is in place is means of removably mounting a plurality of cards. In the board shown this means comprises a series of upright guide means each comprising a pair of laterally spaced inwardly facing guide channels 19, which channels are also open at the top for insertion of a series of separate cards 20, 21, 22, 23 and 24, each guide means being arranged so as to be in alignment with and under one of the pictures of the objects seen on the strip 15. These channels may be provided by strips 19a of suitable material and there may or may not be an upwardly facing channel 19b in the lower strip 19c. These cards may be of any suitable material, such, for example, as stiff paper or the like, or cardboard, and are of a size to be readily inserted in the open top ends of the channels 19 and to lie edge to edge one above the other, or side by side as shown in Fig. 1. Each card has printed thereon a name corresponding to the name of one of the objects pictured on the strip 15, and in each set there is provided a number of these cards corresponding to each of the pictures on a given strip. Thus, for example, there are a number of identical cards having the word "duck" printed thereon corresponding to the first picture of the strip with a similar series of cards for the remaining pictures. The word printed on each card is preferably identical with the word printed under the picture to which it applies. That is, it is preferably of the same size and type of lettering, and is also arranged closer to the top edge of the card than to the bottom edge so that it will be indicated to the child which is the top edge should he not have sufficient knowledge of the word to determine the upright position of the word from the word itself. It is preferred to have not more than five pictures on a single strip 15, although of course the number may be made more or less as found desirable, but in use of the device as indicated, five is generally the preferred number.

It will be understood that in any given set of the device, one or more strips 15 having pictures of different objects may be provided, and provided for use with each strip is a series of a plurality of cards having printed thereon the name of one of the pictures as indicated. In use of the device the strip 15 is inserted in its supporting means at the top of the board, and then the child is to insert the corresponding cards 20 to 24 in the proper guide means 19 to correspond with the different pictures, Fig. 1 showing the cards correctly inserted. As the name printed on the respective cards is the same and identical with that printed on the strip 15 for each picture, the child can readily match up the cards for the corresponding object and learn the word that identifies this object, the word being repeated for each object depending on the number of cards for each picture. Also as the name is printed adjacent the top edge of the card it indicates to the child which longitudinal edge is the top edge of the card and how the card is to be inserted in the guideways 19, even should the child not be sufficiently familiar with the word to know its upright position.

Not only may the child learn the proper word or pictures of different objects from this device, but other vocabulary words can be built around the object words, such as those on the cards 20 to 24. That is, the board may be turned to a position ninety degrees from Fig. 1, as shown in Fig. 8, so that the guide channels 19 are horizontal, and then other cards such, for example, as the cards 25 and 26, with other words whereby sentences may be formed with one or more cards 20 to 24 having the object words thereon, as indicated in Fig. 8. Thus, by use of two or three extra words, for example, sentences may be formed after the five basic or object words are learned.

Thus, as indicated above, this device may be used by a small child to readily help him to coordinate and learn the words. It is a simple and effective device which may be used either by a teacher in school or by the child's parents at home. It also eliminates that human element, a poor or unenthusiastic teacher. It will provide a challenge to the children and stimulate them to put forth an effort they would not use for ordinary word drill. They will give it more voluntary attention than the methods now commonly used. It can be used as a competitive game by several children to see which can complete his board first. In addition to its use to permit other vocabulary words to be built around the object words by having them form sentences with the use of two or three extra words after the five object words have been learned, as above described, it provides an easy way to build a pattern of perception quickly and well, and it may be used later for phonics drill, as for example:

```
father    at
farm  or  bat
fruit     fat
```

Still further, manipulation by this device by a child develops skill. It may also be correlated with readers, and the greater activity for word comparison offered in this new manner makes for a quicker and more successful way of teaching word perception, a word drill presented in a new manner. To a child it has the challenge of a game, the skill of a puzzle, and the offer of great satisfaction on completion. In it, the child has many visual and physical contacts with the words. A small child has no future aims. The activity presented to him is only as important as a method of learning as it is important to the child for its own sake.

Having thus set forth the nature of my invention, I claim:

1. A word drill device comprising a board provided with holding means at the top thereof adjacent its opposite upright edges, an elongated horizontal strip of paper or the like mounted by said holding means and having printed thereon side by side longitudinally of the strip a series of pictures of different objects and the name of the object associated with each picture, an upright guide means under each picture comprising laterally spaced inwardly facing channels, and a series of separate cards for each picture each having the name of the object of this picture printed thereon and adapted to be inserted into the guide means associated with the corresponding picture providing a vertical column of these cards one above the other under this picture.

2. A word drill device comprising a board having at its upper end adjacent its opposite upright edges laterally spaced inwardly facing guide channels, a paper strip mounted at its opposite ends in said channels and having printed thereon a series of pictures of different objects arranged side by side longitudinally of the strip and the name of the object under each picture, said board provided on its front face under each picture with a guide means comprising laterally spaced upright inwardly facing channels, and a series of separate cards for each picture having printed thereon the name of the object for said picture and each adapted to be inserted in the guideway under the corresponding picture and held in a vertical line of a plurality of said cards one above the other in alignment with the picture.

3. A word drill device comprising a board, an elongated strip mounted in a horizontal position at the top of said board having printed thereon a series of pictures of different objects arranged side by side longitudinal of the strip and the name of the object under each picture, a plurality of separate cards for each picture having printed thereon the name of the picture in the same size and type of lettering as that under the corresponding picture and arranged closer to the top edge of the card than the bottom edge, and means on the board for removably holding a plurality of the cards carrying the name for each picture in a vertical line side by side one above the other under the picture and in alignment therewith.

4. A word drill device comprising a board having top and bottom longitudinal edges and upright side edges, said board provided on its front face at the top thereof with upright inwardly facing channels adjacent its upright side edges and open at the top adapted for insertion of the opposite ends of an elongated strip having a series of pictures of different objects thereon arranged side by side longitudinally of the strip, and a series of upright guide means on the front face of the board each comprising a pair of laterally spaced inwardly facing channels open at the top for insertion of the opposite end edges of a series of separate cards one above the other in vertical alignment with one of the pictures.

References Cited in the file of this patent
UNITED STATES PATENTS

| | | |
|---|---|---|
| 388,486 | Hall | Aug. 28, 1888 |
| 1,394,620 | Haupt | Oct. 25, 1921 |
| 1,401,341 | McDade | Dec. 27, 1921 |
| 1,826,934 | Holmes | Oct. 13, 1931 |
| 1,830,150 | Weishaar | Nov. 3, 1931 |
| 2,474,447 | Wheelock | June 28, 1949 |